Nov. 21, 1967 V. V. BURNS Re. 26,299

COLLAPSIBLE STORAGE POUCH

Original Filed Dec. 27, 1962

INVENTOR.
VERN V. BURNS

BY Mallinckrodt and Mallinckrodt

ATTORNEYS

United States Patent Office

Re. 26,299
Reissued Nov. 21, 1967

26,299
COLLAPSIBLE STORAGE POUCH

Vern V. Burns, Salina, Utah 84654

Original No. 3,165,247, dated Jan. 12, 1965, Ser. No. 247,744, Dec. 27, 1962. Application for reissue July 21, 1966, Ser. No. 570,123
5 Claims. (Cl. 224—42.42)

Matter enclosed in heavy brackets [ ] appears in the original patent but forms no part of this reissue specification; matter printed in italics indicates the additions made by reissue.

*ABSTRACT OF THE DISCLOSURE*

*A pouch of flexible sheet material for storing items behind a pivotable back of a vehicle seat. The pouch is constructed to have a V-shape that opens to display items contained therein upon forward pivoting of the seat back.*

*Brief Description*

Figure 1:
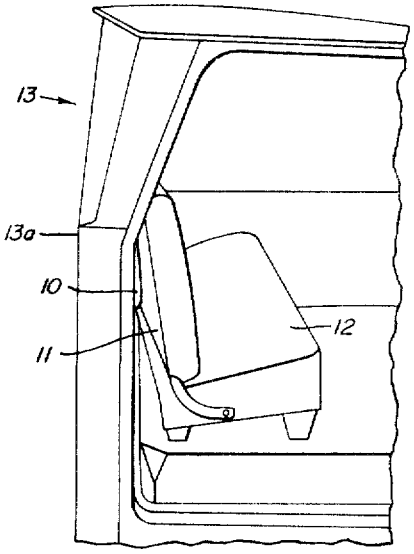

This invention relates to pouches or bags for article storage and is particularly concerned with providing a device of this kind for quickly and easily converting normally wasted space behind seats of vehicles into a handy and useful storage area.

Many vehicles, particularly trucks, have a cab in which the operator sits on a seat that is adjustable forwardly and backwardly to facilitate positioning of the driver most comfortably and in which the back of the seat is rotatable about a base pivot to a forward position to provide access to areas behind the seat. In order to accommodate rearward movement of the seat, as well as the usual rearward slant of the back of the seat, it is necessary that some space be provided behind the seat. Such space is widest near the floor of the vehicle and narrows in tapered manner as it extends upwardly to the seat top. This is due to the slant of the back of the seat. In some instances, the wide space near the floor is utilized for placement of a gas tank or some other structural component of the truck, but, invariably, the narrower upper space is wasted or is stuffed in haphazard manner with such miscellaneous items as can be made to fit.

Even though such items as fishing tackle, rifles, maps, and similar equipment that should be kept substantially dust free are often stuffed into this narrow space, they are exposed to dust and dirt and can slip down into undesirable and relatively inaccessible locations.

Therefore, it is a primary object of this invention to provide a collapsible storage pouch or pocket that can be positioned and supported in this narrow and formerly wasted space and will furnish a neat, handy, easily accessible, and protective storage facility for miscellaneous items of various configurations.

Other objects are to provide such a storage pouch whose interior becomes exposed to almost immediate and complete visual inspection and presents the contents for quick selection and removal when the pouch is opened; one that opens automatically upon swinging the back of the vehicle seat forwardly over the seat and is held in opened position by the forwardly-swung seat back; one that can be economically produced from a minimum number of parts, without sacrificing any desired strength; and one that will be stiff enough at the bottom to retain its article-supporting shape longitudinally of the pouch.

To achieve these objects, the storage pouch of the invention is made of strong and flexible sheet materials, such as canvas, in the form of a V-shaped, elongate, relatively shallow trough and is provided with means to quickly and easily attach it between the cab of a truck and the rear of the adjacent seat back. As so constructed, the pouch is opened and the sheet material stretched substantially taut to afford easy visual inspection and access to its contents when the seat back is swung forwardly over the seat.

A longitudinal partition is advantageously provided in the trough, and individual pockets are preferably formed on the rear walls. These do not interfere with satisfactory opening and closing of the pouch. The pockets and the longitudinal compartments formed by the divider increase the types of articles that may conveniently be carried, and, hence, the overall utility of the pouch.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
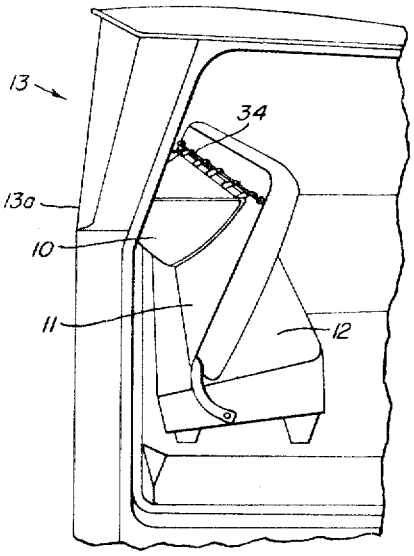
Figure 3:
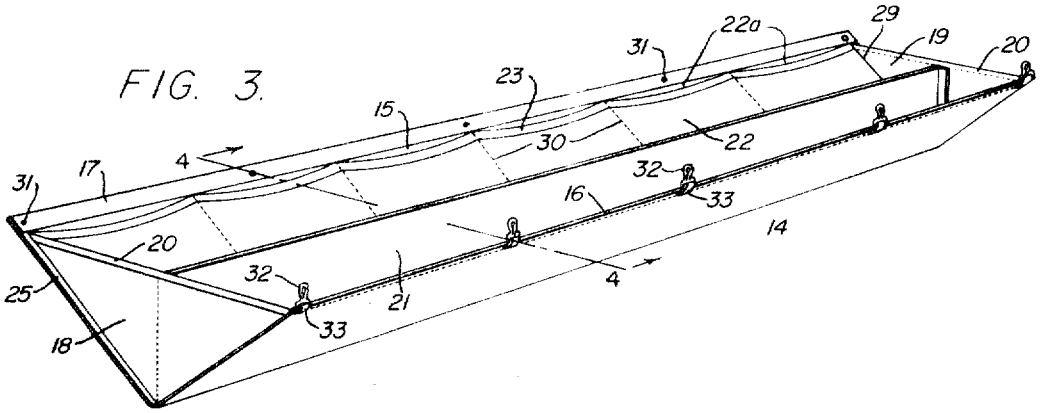

In the drawing:

FIG. 1 is an isometric view of a pouch conforming to the invention mounted in the cab of a truck, which is shown only fragmentarily, the back of the seat being in normal upright position;

FIG. 2, a similar view with the seat back swung forwardly and the pouch opened into substantially taut, troughed-tray formation;

FIG. 3, an isometric view of the open pouch shown per se; and

Figure 4:
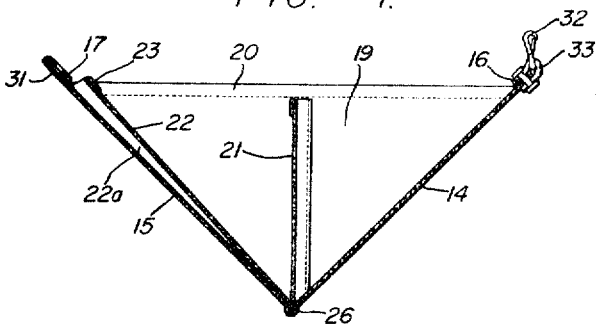

FIG. 4, a transverse vertical section taken on the line 4—4 of FIG. 3.

Detailed description

Referring to the drawing:

In the illustrated preferred construction, the pouch 10 is shown in FIGS. 1 and 2 as mounted between the back 11 of the seat 12 of a truck cab 13 and the rear wall 13a of such cab, at the upper rear of the seat-back 11.

The pouch, shown best in FIG. 3, is constructed of strong and flexible sheet material, as for example, canvas. This material has been found very suitable because of its flexibility, strength, durability, and relatively low cost.

Front and rear walls 14 and 15 are preferably formed of a single piece of material, as shown, the length and width of which are determined by the dimensions of the space in which the pouch is to be used. A piece fifty-four by twenty-six inches will give an overall length to the completed pouch of fifty-three inches, and, for most pick-up trucks, has been found very satisfactory. This single piece construction not only reduces costs, but provides a pouch of maximum strength.

In constructing the pouch, the top margin of each wall is preferably turned back and sewed in place to provide wide double hems 16 and 17. These hems provide the strength required for anchoring fasteners used to support the pouch in its allotted position between the rear wall of the cab and the confronting rear of the back of the seat, as will appear hereinafter.

End pieces 18 and 19 are preferably cut separately in such manner that, after being sewn to the ends of the front and rear walls they form respective inverted isosceles triangles. As illustrated, it is preferred that the sides of such triangular end walls conform in length to the front and rear walls between the marginal hems 16 and 17. The size of the apex angles, and the length of the triangle bases are determined by the size opening desired for the pouch.

The side margins of the triangular end pieces are sewed to the end margins of the walls to form a V-shaped trough. To increase the overall strength of the pouch, the margins of the bases of the respective triangular end pieces are turned back and sewed to form double hems 20, the top edges of which will extend between the bottoms of hems 16 and 17 of the front and rear walls.

The pouch is advantageously divided longitudinally of its length by a partition wall 21 and is also advantageously provided with a pocket facing 22 forming, with the inner face of the rear wall, a series of pockets 22a. These are conveniently and economically formed from a single rectangular piece of the same material as and of the same length as the piece from which the walls are formed. The longitudinal margins of this piece are hemmed as at 23 and 24 and are sewed to the piece forming the outer walls such that the top of hem 23 extends between the bottoms of hems 20 of the triangular side pieces, at their center, the ends of the divider section being sewed to the end pieces, as at 25. The peak formed by the divider or partition wall 21 and by the pocket facing 22 is sewed to the peak formed by the front and rear walls 14 and 15, as at 26. This construction serves to longitudinally stiffen, and thereby to maintain the shape of the pouch.

The pocket facing is sewed to the rear wall 15 at both its ends 29, and at intervals 30 therealong, to provide pockets of desired sizes.

As previously mentioned, attachment means are spaced along the double hems 16 and 17 of the front and rear walls of the pouch. Since the rear wall is usually fixed to the cab of the truck or other vehicle with which the pouch is used, the attachment means conveniently consist of holes 31 through which sheet metal screws are passed and threaded into corresponding holes in the cab. It is apparent, however, that other means to hold the rear wall fixed could be provided.

Because it is desirable to have one wall of the pouch detachable from the vehicle to allow easy cleaning, the attachment means of the front wall conveniently comprise spring-clips 32 pivotally fixed to the hem 16 of such front wall by loops 33, which pass through holes in the bases of the respective clips. The loops 33 are made of extra strong material, such as leather, and are connected to the hem of the front wall 14 by rivets, or other strong securing means.

In use, the rear wall 15 of the pouch is secured to the vehicle body in the manner described and the spring clips 32 are attached to the rear of the seat back, as shown in FIGS. 1 and 2. These spring-clips may, for example, be connected to a transverse spring rod 34.

As the seat is swung forwardly from its normal seating position of FIG. 1 to the position of FIG. 2, the pouch is automatically opened and presents a widely troughed, tray-like interior for easy access. Large items, such as rifles, axes, and fishing tackle, are placed in the longitudinal compartments formed between the divider or partition wall 21 and the front wall 14 on the one hand, and between such divider or partition wall and the pocket facing 22 on the other hand, whereas smaller items, such as record books, maps, etc., are most conveniently kept in the individual pockets formed between the pocket facing and the rear wall 15 of the pouch.

The items carried in the pouch are maintained substantially dust-free, because, as the seat is swung to the position of FIG. 1 from its open position of FIG. 2, the pouch will close to a great extent and also because most of the dust coming up through the vehicle floorboards is obstructed from going up, over and into the pouch by the position of the pouch itself. Thus, the dust collects on the outside bottom of the pouch or falls back to the vehicle floor.

In the event it should be desirable to clean the pouch, it is only necessary to release the spring clips and drop the front wall. This allows the inside of the pouch to be easily brushed clean. Additionally, when the pouch is made of canvas or other washable material, it is a simple matter to release both walls from their supports and remove the pouch for washing purposes.

Whereas this invention is herein illustrated and described with reference to a certain presently preferred structural form thereof, it should be understood that other forms may be produced in accordance with the teachings hereof, by those skilled in the art, without departing from the generic concept of the following claims.

I claim:

1. In combination, a collapsible storage pouch and a vehicle having a passenger cab and seat in the cab with a forwardly swingable back, said pouch comprising front and rear walls made of a single piece of flexible sheet material and forming a V-shaped trough, the upper margin of said rear wall being fixed to said vehicle cab and the upper margin of said front wall being removably fixed to the rear of the said seat back; inverted, triangular end pieces of flexible sheet material at each end of said trough; a partition wall extending the length of the trough and being fixed to and substantially bisecting said end pieces; and a facing of flexible sheet material fixed to said rear wall at its ends and at intervals along its length to form a series of article-receiving pockets, said partition wall and said facing being formed of a single piece of flexible sheet material having a line of fold extending along and fixed to the bottom of said V-shaped trough formed by said front and rear walls.

2. A collapsible, elongate, storage pouch, comprising unitary, elongate front and rear walls of flexible sheet material; end pieces substantially in the shape of inverted isoseceles triangles and made of flexible sheet material, the sides of said end pieces being connected to the ends of said walls to form a V-shaped trough; a series of fastening means extending along the upper margin of each of said front and rear walls, for attaching the pouch along the seat back and the back cab wall of a pick-up truck in position to be automatically opened when the seat back is pivoted forwardly; a facing of flexible sheet material provided for the rear wall interiorly of the pouch and seamed thereto to provide a series of article-receiving pockets; a central partition wall of flexible sheet material substantially bisecting the bases of said triangles, fixed to the end pieces, and seamed to the front and rear wall at the bottom of the trough to form a longitudinal stiffener extending the length of the pouch.

3. A pouch according to claim 2, wherein the facing of flexible sheet material, provided for the rear wall interiorly of the pouch, and the central partition wall are formed of a single piece of flexible sheet material.

*4. In combination, a collapsible storage pouch and a vehicle having a passenger cab and a seat in the cab with a forwardly swingable back, said pouch being made of flexible sheet material and comprising front and rear walls interconnected at their lower margins to form a V-shaped trough for the retention of articles when the seat is in a normal, upright travelling position and for presenting a widely troughed, tray-like interior for easy access when said seat is swung forwardly; a facing of flexible sheet material fixed to the rear wall at its ends and at intervals along its length to form a series of article receiving pockets; means for attaching the upper margin of said rear wall to said vehicle cab; and means for removably connecting the upper margin of said front wall to the rear of said seat back whereby the trough is suspended from the attaching and connecting means into the space between the cab and seat when the seat is in its normal, upright travelling position and is stretched to raise the bottom of the trough and to present the widely troughed, tray-like interior when the seat is swung forwardly.*

*5. The combination of claim 4, wherein the facing is seamed along its length to the flexible sheet material forming the front and rear walls at the connected lower margins of said walls.*

(References on following page)

References Cited

The following references, cited by the Examiner, are of record in the patented file of this patent or the original patent.

UNITED STATES PATENTS

| | | | |
|---|---|---|---|
| 365,326 | 6/1887 | Abramson | 297—190 |
| 1,513,514 | 10/1924 | London | 150—1 |
| 1,527,056 | 2/1925 | Martin | 224—42.46 |
| 1,824,288 | 9/1931 | Meyer. | |

| | | | |
|---|---|---|---|
| 2,196,196 | 4/1940 | Dorsey. | |
| 2,437,149 | 3/1948 | Baxter | 150—1 |
| 2,507,842 | 5/1950 | Waddill | 224—42.46 |

FOREIGN PATENTS

| | | |
|---|---|---|
| 3,935 | 2/1906 | Great Britain. |

GERALD M. FORLENZA, *Primary Examiner.*

F. E. WERNER, *Assistant Examiner.*